US 9,237,365 B2

(12) United States Patent
Kandanala et al.

(10) Patent No.: US 9,237,365 B2
(45) Date of Patent: Jan. 12, 2016

(54) PAY-PER-VIEW PORTAL

(75) Inventors: Venket S. Kandanala, Highland Village, TX (US); Nicky Pinakin Joshi, Flower Mound, TX (US); Anand N. Sankaran, MGR Nagar (IN); Rajesh Narayanan, Virugambakkam (IN); Lisa A. Caputo, Dade City, FL (US); Karthik Srinivasan, Flower Mound, TX (US); Mousumi Dasgupta, Irving, TX (US); Jubish C. Parambath, Madipakkam (IN); Sudharsan Selvakumar, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 155 days.

(21) Appl. No.: 13/205,973

(22) Filed: Aug. 9, 2011

(65) Prior Publication Data

US 2013/0042284 A1    Feb. 14, 2013

(51) Int. Cl.
    H04N 7/173      (2011.01)
    H04N 21/258     (2011.01)
    H04N 21/472     (2011.01)
    H04N 21/482     (2011.01)

(52) U.S. Cl.
    CPC ... *H04N 21/25891* (2013.01); *H04N 21/47211* (2013.01); *H04N 21/4826* (2013.01); *H04N 21/4828* (2013.01)

(58) Field of Classification Search
    USPC ............. 725/104, 121, 114, 86, 91, 103
    See application file for complete search history.

(56) References Cited

U.S. PATENT DOCUMENTS

| | | | |
|---|---|---|---|
| 5,592,551 A * | 1/1997 | Lett et al. ............... 380/211 |
| 6,532,589 B1 * | 3/2003 | Proehl et al. ............ 725/40 |
| 7,970,750 B2 * | 6/2011 | Goel ............. G06F 17/30864 707/706 |
| 8,386,317 B2 * | 2/2013 | Brown et al. ........... 705/14.49 |
| 2003/0151621 A1 * | 8/2003 | McEvilly et al. ........ 345/744 |
| 2003/0233540 A1 * | 12/2003 | Banerjee et al. ......... 713/153 |
| 2005/0262533 A1 * | 11/2005 | Hart et al. ............... 725/40 |
| 2007/0113250 A1 * | 5/2007 | Logan et al. ............. 725/46 |
| 2008/0300908 A1 * | 12/2008 | Hunter et al. ............ 705/1 |
| 2009/0150940 A1 * | 6/2009 | St.John-Larkin ........ 725/59 |
| 2010/0186038 A1 * | 7/2010 | Thomas et al. .......... 725/42 |
| 2010/0205625 A1 * | 8/2010 | Beyabani et al. ........ 725/8 |
| 2011/0167084 A1 * | 7/2011 | Bovenschulte .... G06Q 30/0257 707/769 |
| 2012/0136658 A1 * | 5/2012 | Shrum et al. ........... 704/231 |
| 2014/0095491 A1 * | 4/2014 | McCoskey ......... H04N 7/17318 707/723 |

* cited by examiner

*Primary Examiner* — Nnenna Ekpo

(57) ABSTRACT

A method and system that provides customers a pay-per-view portal, accessible via a television service, a mobile service, or an Internet service. The pay-per-view portal permits customers to search for pay-per-view programs and provide search results that include related content to pay-per-view programs including related videos, articles, biographical summaries, stats on players or fighters, and images. The pay-per-view portal provides personalized pay-per-view program recommendations, pay-per-view calendars, and sub-portals directed to categories or sub-categories of pay-per-view programs. The pay-per-view portal also provides the ordering and purchasing of pay-per-view programs days, weeks, or months in advance of the airing of the pay-per-view programs.

22 Claims, 14 Drawing Sheets

PAY-PER-VIEW PORTAL

BACKGROUND

Television service, offered by a service provider, typically includes pay-per-view (PPV) offerings. PPV permits customers to purchase various types of programs that are not ordinarily available under television service subscriptions. The programs available under PPV and the advertisements promoting the programs are the same for each customer of the television service.

DETAILED DESCRIPTION OF PREFERRED EMBODIMENTS

Figure 1:
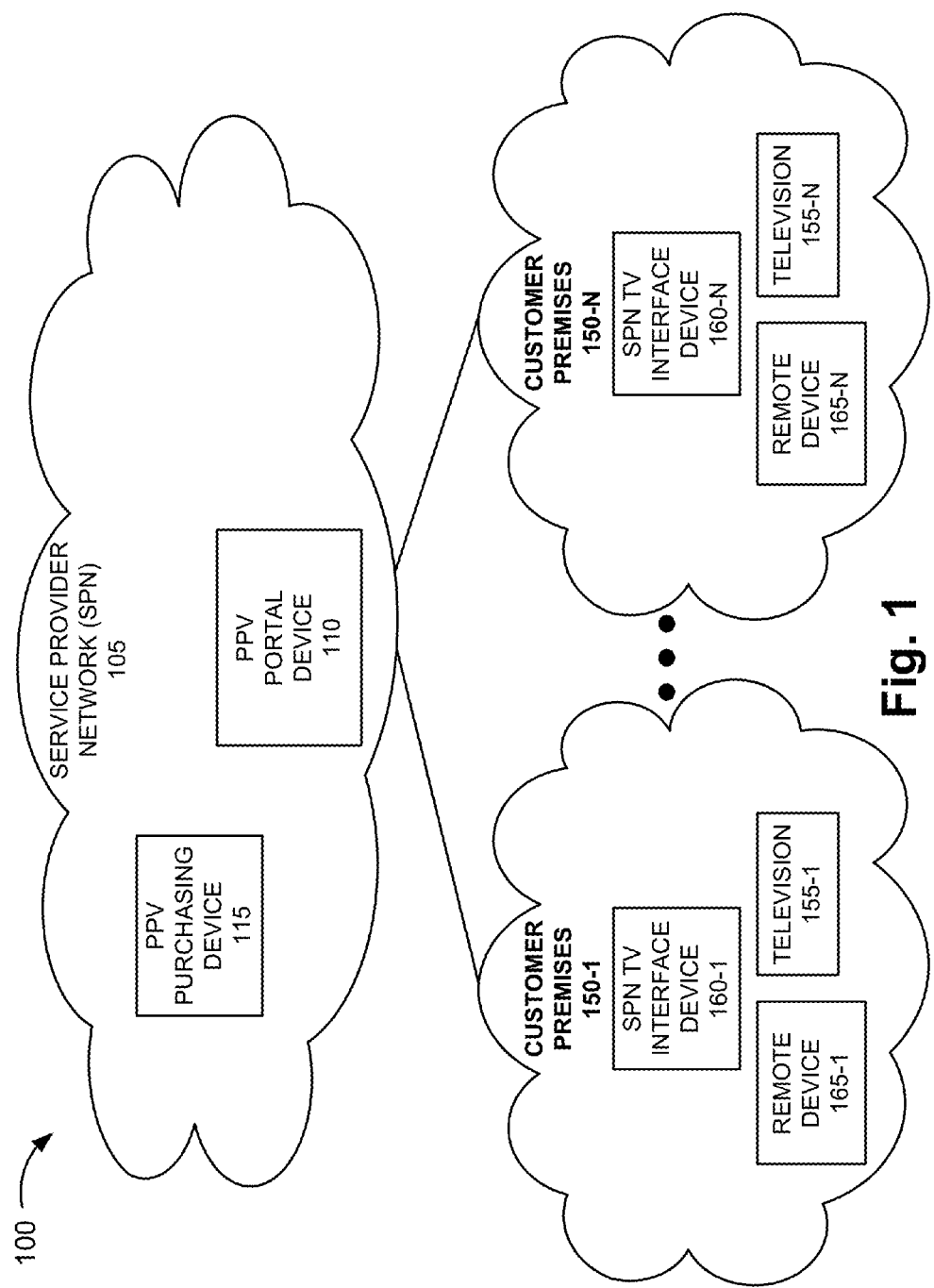
FIG. 1 is a diagram illustrating an exemplary environment in which an exemplary embodiment of a PPV portal may be implemented.

The following detailed description refers to the accompanying drawings. The same reference numbers in different drawings may identify the same or similar elements. Also, the following detailed description does not limit the invention.

The term "PPV program," as used herein, is intended to include a variety of audio and visual content. For example, a PPV program may be a sporting event, a musical event, a comedic event, adult content, and other type of special event. A PPV program may be in various formats, such as, for example, standard definition, high definition (HD), and 3-D, and in various languages (e.g., English, Spanish, etc.).

According to an exemplary embodiment, PPV program services are provided to customers via a PPV portal. The PPV portal may provide one or more PPV program services that are personalized to customers. According to an exemplary embodiment, the PPV portal is accessible to customers via a television service. According to another exemplary embodiment, the PPV portal is accessible to customers via a mobile service or an Internet service.

According to an exemplary embodiment, the PPV portal permits customers to search for PPV programs. The PPV portal may provide search results that include not only PPV programs that match or are relevant, based on a search query, but also related content, such as, for example, articles, related programs, web sites, images, bios, player stats, player records, and/or other types of information.

According to an exemplary embodiment, the PPV portal includes dedicated sub-portals directed to particular types of PPV programs. For example, according to an exemplary embodiment, the PPV portal may permit customers to access a specific type of sports sub-portal (e.g., boxing, basketball, wrestling, mixed martial arts (MMA), etc.), music sub-portal (e.g., by music genre, by band and/or musician, etc.), etc. PPV programs may be categorized based on PPV program types (e.g., sports, music, comedy, miscellaneous, etc.). PPV programs may be further sub-categorized, as described further below. Additionally, for example, PPV programs may be categorized or grouped based on price, time of airing, and/or other types of grouping factors.

According to an exemplary embodiment, the PPV portal may permit customers to access a specific third party sub-portal (e.g., Ultimate Fighting Championship (UFC), WWE, Golden Boy Promotions, etc.). The third party sub-portal may showcase exclusive PPV programs, offer bundling PPV packages at discount prices, etc.

According to an exemplary embodiment, the PPV portal may provide recommendations to customers regarding PPV programs. For example, the PPV portal selects PPV programs to advertise to customers based on previous customer purchase behaviors.

According to an exemplary embodiment, the PPV portal includes PPV calendars for customers that display PPV programs according to the time of airing of the PPV programs. According to an exemplary embodiment, a PPV calendar may be populated with all upcoming PPV programs. According to another exemplary embodiment, a PPV calendar may be populated with recommended PPV programs that have been identified as being of interest to the customer. According to another exemplary embodiment, a PPV calendar may be populated with other PPV programs based on some other filtering factor (e.g., category or sub-category of PPV programs, purchased PPV programs, etc.). According to an exemplary embodiment, the PPV calendar permits a customer to set customer preferences pertaining to the PPV calendar (e.g., PPV programs to be included in the PPV calendar, the time period of the calendar, etc.).

According to an exemplary embodiment, the PPV portal permits customers to purchase PPV programs a day, several days, week(s), or month(s) in advance of the airing of the PPV programs. For example, customers may purchase a PPV program on the day of the first advertisement of the PPV program. This is in contrast to other systems that limit a time to purchase a PPV program ahead of the air time, for example via a television service, to approximately 30 minutes or some other relatively short time frame. According to an exemplary embodiment, a network device receives PPV program purchasing requests and stores them in a time-based queueing system. The network device monitors the current time vis-à- vis the scheduled air time so that the PPV program is made available to the customer when the scheduled time occurs.

FIG. 1 is a diagram illustrating an exemplary environment 100 in which an exemplary embodiment of a PPV portal may be implemented. As illustrated in FIG. 1, environment 100 may include a service provider network (SPN) 105 and customer premises 150-1 through 150-N (referred to generally as customer premises 150). Service provider network 105 includes, among other devices, a PPV portal device 110 and a PPV purchasing device 115. Customer premises 150 includes, among other devices, televisions (TVs) 155-1 through 155-N (referred to generally as TV 155 or TVs 155), SPN TV interface devices 160-1 through 160-N (referred to generally as SPN TV interface device 160 or SPN TV interface devices 160), and remote devices 165-1 through 165-N (referred to generally as remote device 165 or remote devices 165).

The number of devices and networks, and the configuration in environment 100 is exemplary and provided for simplicity. In practice, according to other embodiments, environment 100 may include additional devices, fewer devices, different devices, and/or differently arranged devices, than those illustrated in FIG. 1.

According to other embodiments, a single device may be implemented as multiple devices and/or multiple devices may be implemented as a single device. For example, although PPV portal device 110 and PPV purchasing device 115 are illustrated as separate devices, PPV portal device 110 and PPV purchasing device 115 may be combined into a single device. A device may be implemented in a centralized or distributed fashion. Additionally, a device may be implemented according to various architectures (e.g., a client device, a server device, a peer device, or a combination thereof).

Additionally, or alternatively, in practice, environment 100 may include additional networks and/or differently arranged networks, than that illustrated in FIG. 1. For example, customer premises 150 may include a local area network (LAN) and/or other types of networks may be included in environment 100, such as a network provider network, a content provider network, the Internet, etc.

Also, according to other embodiments, one or more functions and/or processes described as being performed by a particular device may be performed by a different device, or some combination of devices. By way of example, one or more functions and/or processes described as being performed by PPV purchasing device 115 may be performed by PPV portal device 110 or vice versa, or in combination. Additionally, or alternatively, one or more functions and/or processes described as being performed by PPV portal device 110 and/or PPV purchasing device 115 may be performed by SPN TV interface device 160 or vice versa, or in combination. Environment 100 may include wired and/or wireless connections among the devices illustrated. By way of example, customer premises 150 may connect to service provider network 105 via optical fiber, cable, etc.

Service provider network 105 includes a network that distributes or makes available television service. Service provider network 105 may correspond to a satellite-based network and/or a terrestrial-based network. Although not illustrated, service provider network 105 may include, for example, program distribution devices, program storage devices, application servers, billing devices, security devices, etc. Service provider network 105 may also provide other types of services to customers, such as Internet service and/or mobile service. According to an exemplary embodiment, customers may have access to the PPV portal, as described herein, via such services (e.g., Internet service, mobile service) when using suitable customer devices (e.g., a desktop computer, a laptop computer, a mobile device (e.g., a smartphone, a tablet device, etc.), a vehicle-based device (e.g., a vehicle communication system), etc.).

PPV portal device 110 includes one or multiple network devices that provide the PPV portal to customers, as described herein. PPV portal device 110 may take the form of a computational device (e.g., a Web server, a server, an application server, a computer). PPV portal device 110 provides graphical user interfaces to permit customers to receive PPV services via the PPV portal. The PPV portal is described further below.

PPV purchasing device 115 may include one or multiple network devices that receive customers' requests for ordering and/or purchasing PPV programs. PPV purchasing device 115 may take the form of a computational device (e.g., a Web server, a server, an application server, a computer). According to an exemplary embodiment, PPV purchasing device 115 provides graphical user interfaces to permit customers to order and/or purchase PPV programs. According to another embodiment, PPV purchasing device 115 may receive customers' orders and/or purchase requests from another device (e.g., PPV portal device 110), which may provide graphical user interfaces to permit customers to order and/or purchase PPV programs. PPV purchasing device 115 is described further below.

Customer premises 150 include locations where customers receive service from service provider network 105. For example, customers may receive services at home, at work, or at locations when the customers are mobile. Customer premises 150 include devices that allow customers to receive PPV services via the PPV portal. For example, in a home setting, customer premises 150 may include TVs 155, SPN TV interface devices 160, and remote devices 165. Additionally, according to another embodiment, customer premises 150 may include various devices to allow customers to receive PPV services via Internet service and/or mobile service, as described herein.

TV 155 may include a device to display PPV programs. According to an exemplary embodiment, TV 155 may correspond to a television. According to other embodiments, TV 155 may correspond to other types of display devices, such as, for example, a monitor, a mobile device having a display, etc. According to an exemplary embodiment, TV 155 and SPN TV interface device 160 may be separate devices, as illustrated in FIG. 1. According to other embodiments, TV 155 may include SPN TV interface device 160 or include some of the functionalities associated with SPN TV interface device 160.

SPN TV interface device 160 may include a device that communicates with service provider network 105 to provide television service including PPV services. According to an exemplary embodiment, SPN TV interface device 160 may take the form of a client device, a thin client device, a set-top box, a converter box, a receiver device, a server device, a peer device, a tuner device, and/or a digibox. According to an exemplary embodiment, SPN TV interface device 160 may also include a digital video recorder (DVR) and/or a hard drive. SPN TV interface device 160 may also provide multi-room television services.

Remote device 165 may include a device that communicates with TV 155 and/or SPN TV interface device 160 to allow a customer to interact with SPN TV interface device 160 and/or TV 155. Remote device 165 may include one or multiple input mechanisms (e.g., buttons, a display, a touchpad, a touchscreen, a microphone, etc.) to receive a customer's input and, among other things, allow the customer to interact with SPN TV interface device 160. According to an exemplary embodiment, remote device 165 may correspond to a remote control device (e.g., a set-top box controller, a TV controller, a converter box controller, etc.).

According to other embodiments, remote device 165 may correspond to other types of devices. For example, remote device 165 may take the form of a tablet device, a mobile communication device, a personal digital assistant (PDA), a handheld device, a smartphone, or some other type of user device. According to still other embodiments, remote device 165 may include TV 155. According to yet other embodiments, remote device 165 may include TV 155 and SPN TV interface device 160 or include some of the functionalities associated with SPN TV interface device 160.

In view of environment 100, a customer may receive PPV services that include, among other things, personalized recommendations for PPV programs, a personalized PPV calendar, time unrestricted pre-ordering, a search engine permitting the customer to search PPV programs and PPV-related content (e.g., images, video clips, text (e.g., articles, player stats, etc.), etc.), PPV program sub-portals, and personalized PPV offers, promotions, bundles, etc., as described further below.

Figure 2:
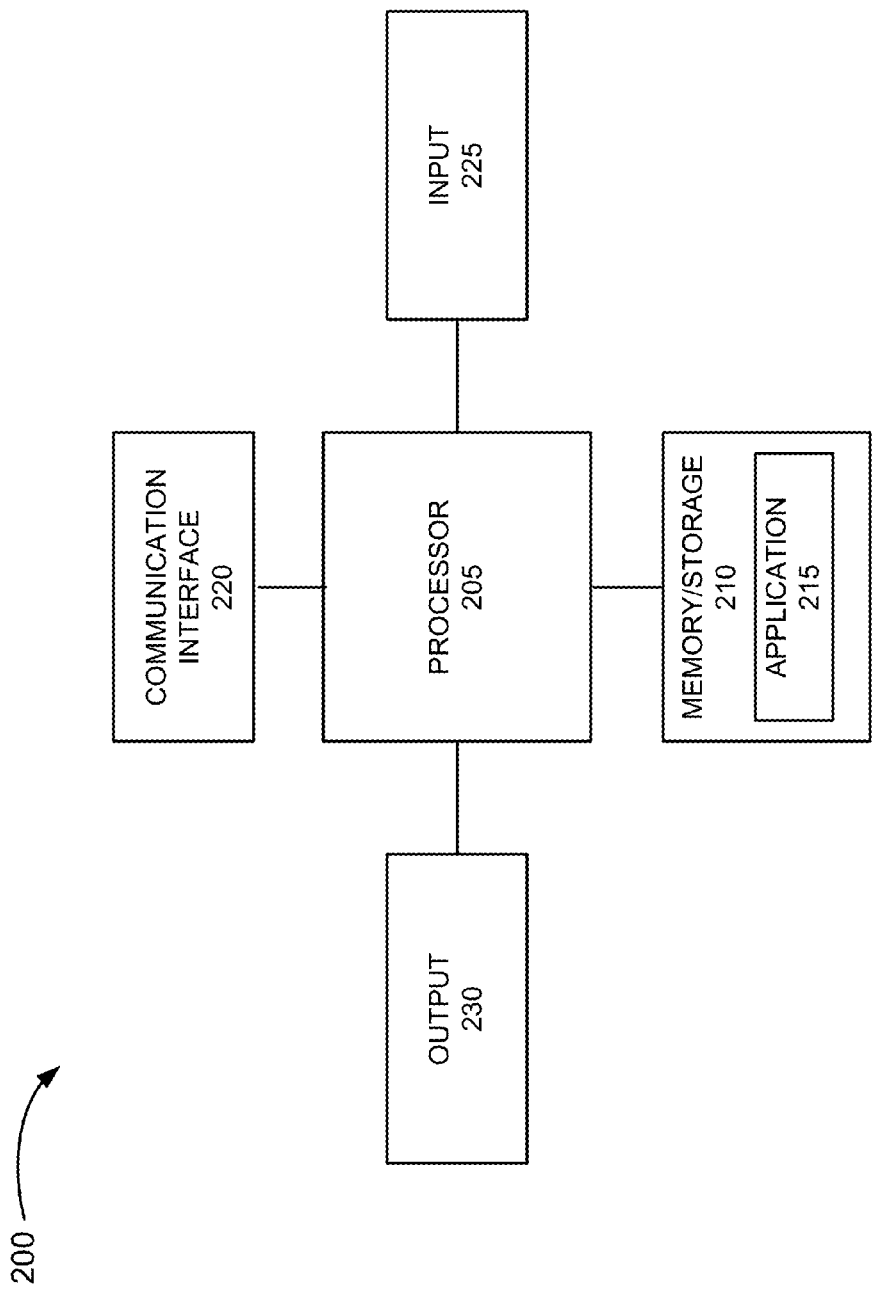
FIG. 2 is a diagram illustrating exemplary components of a device that may correspond to one or more of the devices in the environment depicted in FIG. 1.

FIG. 2 is a diagram illustrating exemplary components of a device 200 that may correspond to one or more of the devices in environment 100. For example, device 200 may correspond to one or more devices in SPN 105 and/or customer premises 150. As illustrated, according to an exemplary embodiment, device 200 may include a processor 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processor 205 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Depending on the type of processor 205, processor 205 may be implemented as hardware (e.g., a microprocessor, etc.), a combination of hardware and software (e.g., a SoC, etc.), may include one or multiple memories (e.g., memory/storage 210), etc.

Processor 205 may control the overall operation or a portion of operation(s) performed by device 200. Processor 205 may perform one or multiple operations based on an operating system and/or various applications (e.g., application 215). Processor 205 may access instructions from memory/storage 210, from other components of device 200, and/or from a source external to device 200 (e.g., a network, another device, etc.).

Memory/storage 210 may include one or multiple memories and/or one or multiple other types of tangible storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.) a floppy disk (e.g., a zip disk, etc.), a tape, a Micro-Electromechanical System (MEMS)-based storage medium, and/or a nanotechnology-based storage medium. Memory/storage 210 may include drives for reading from and writing to the tangible storage medium.

Memory/storage 210 may be external to and/or removable from device 200, such as, for example, a Universal Serial Bus (USB) memory stick, a dongle, a hard disk, mass storage, off-line storage, or some other type of storing medium (e.g., a computer-readable medium, a compact disk (CD), a digital versatile disk (DVD), a Blu-Ray® disk (BD), etc.). Memory/storage 210 may store data, application(s), and/or instructions related to the operation of device 200.

Application 215 may include software or a program that provides various services and/or functions. For example, with reference to PPV portal device 110 and according to an exemplary embodiment, application 215 may include one or multiple applications or programs for providing the PPV portal, as described herein. Additionally, for example, with reference to PPV purchasing device 115 and according to an exemplary embodiment, application 215 may include one or multiple applications or programs for providing PPV customer ordering management, as described herein.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and/or the like.

Input 225 may permit an input into device 200. For example, input 225 may include a keyboard, a mouse, a camera, a scanner, a microphone, a display, a touchpad, a touchscreen, a touchless screen, a button, a switch, an input port, voice recognition logic, speech recognition logic, fingerprint recognition logic, a web cam, and/or some other type of visual, auditory, tactile, etc., input component. Output 230 may permit an output from device 200. For example, output 230 may include a speaker, a display, a touchscreen, a touchless screen, a light, an output port, and/or some other type of visual, auditory, tactile, etc., output component.

Device 200 may perform processes and/or functions, as described herein, in response to processor 205 executing instructions (e.g., application 215) stored by memory/storage 210. By way of example, the instructions may be read into memory/storage 210 from another memory/storage 210 or from another device via communication interface 220. The instructions stored by memory/storage 210 may cause processor 205 to perform one or more processes described herein. Alternatively, for example, according to other implementations, device 200 may perform one or more processes described herein based on the execution of hardware (processor 205, etc.), the execution of hardware and firmware, or the execution of hardware, software, and firmware.

As previously described, the PPV portal provides PPV services. For example, the PPV portal may provide a search service, a sub-portal service, a recommendations service, a calendar service, and an ordering and purchasing service.

Figure 3:
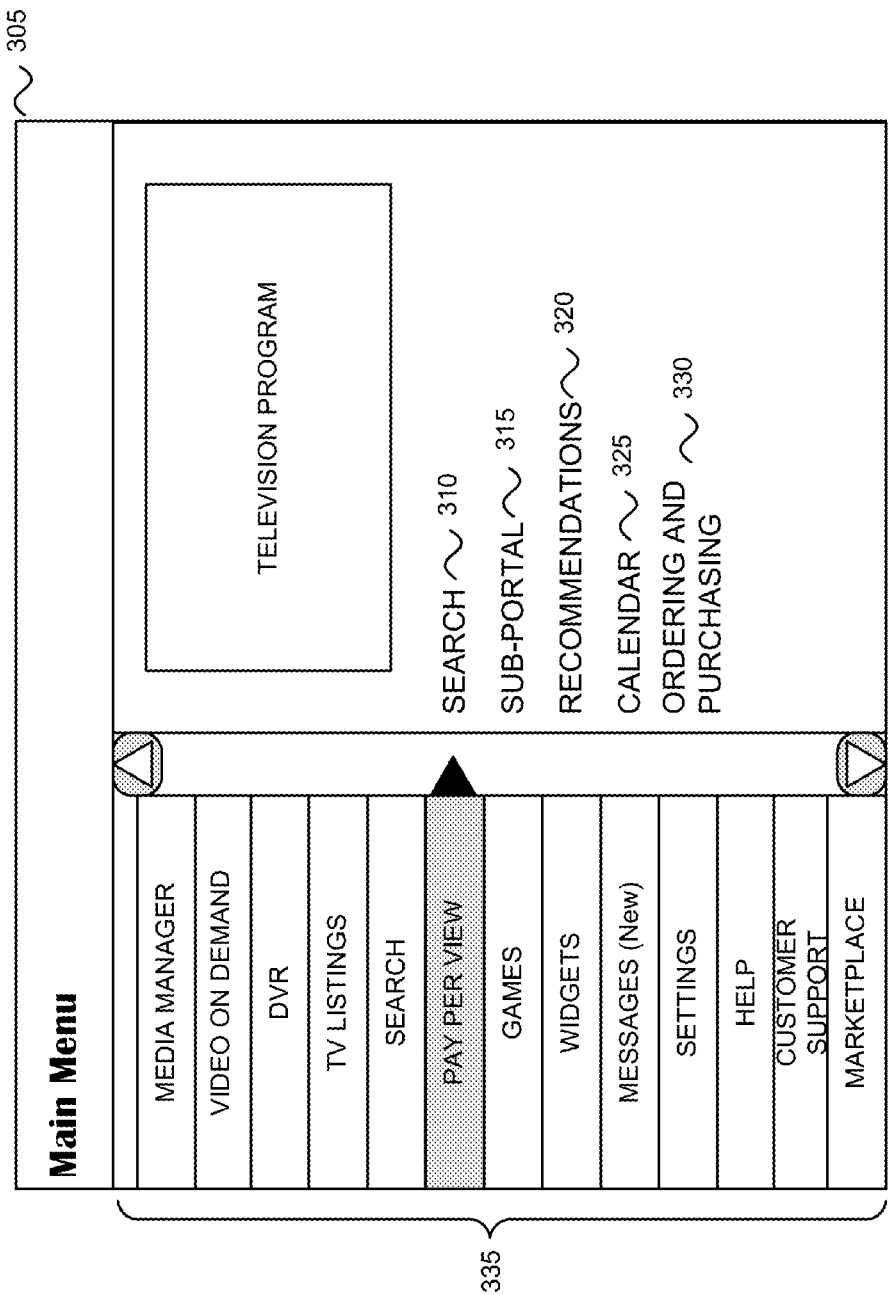
FIG. 3 is a diagram illustrating an exemplary graphical user interface of the PPV portal.

FIG. 3 is a diagram illustrating an exemplary graphical user interface of a PPV portal 305. According to this example, PPV portal 305 is accessible via a main menu screen that includes sub-menus 335. As illustrated, PPV portal 305 includes a graphical user interface that provides access to various services, such as a search service 310, a sub-portal service 315, a recommendations service 320, a calendar service 325, and an ordering and purchasing service 330. These portal services are described further below.

For some services, such as recommendations service 320 and calendar service 325, the PPV portal may identify the customer. For example, the PPV portal may include a login. Alternatively, the PPV portal may identify the customer based on a network address (e.g., a Media Access Control (MAC) address, an Internet Protocol (IP) address, etc.) and/or a device identifier (e.g., a mobile equipment identifier (MEID), a set top box serial number, etc.) associated with the device used by the customer to access and use the PPV portal.

Search service 310 permits customers to search PPV programs and/or content related to PPV programs. For example, FIG. 4 is a diagram illustrating an exemplary graphical user interface of PPV portal 305 pertaining to the search service.

Figure 4:
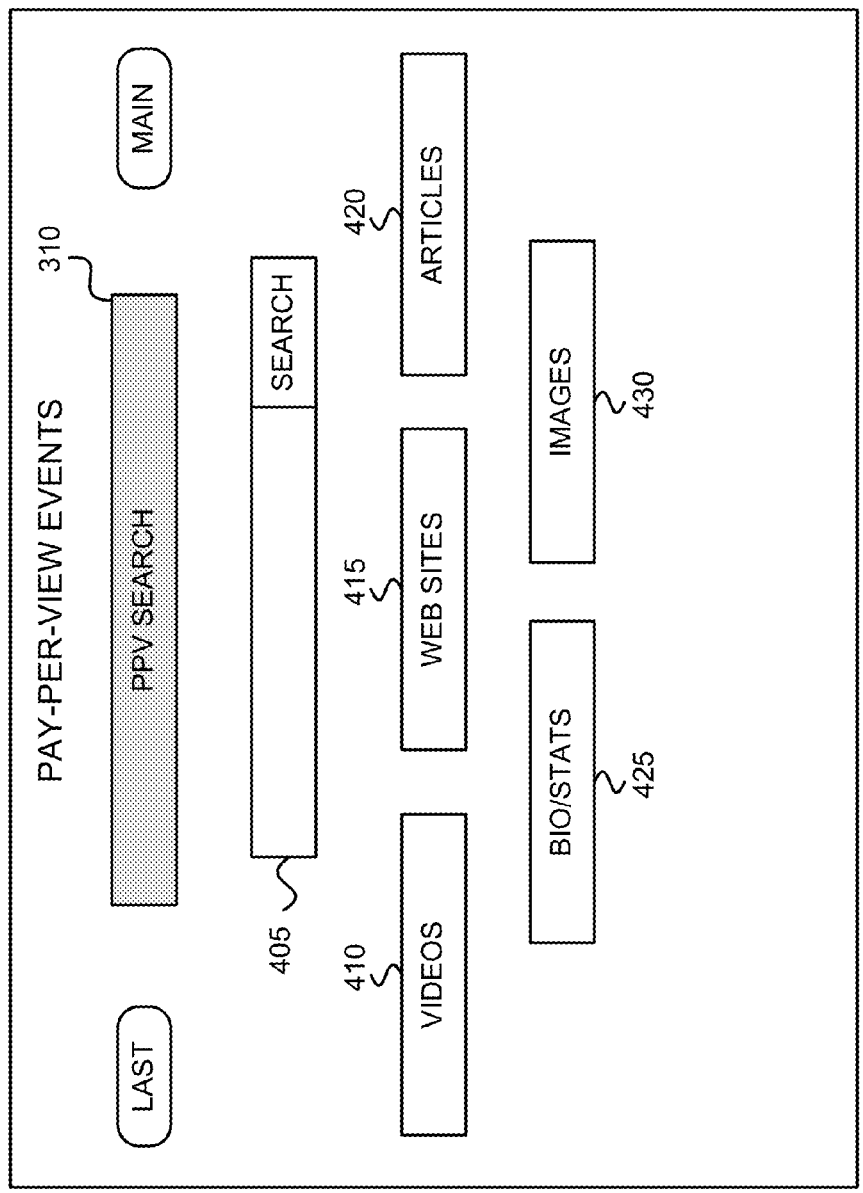
FIG. 4 is a diagram illustrating an exemplary graphical user interface of the PPV portal pertaining to PPV program searches.

As illustrated in FIG. 4, the graphical user interface includes a search query field 405 to permit customers to search for PPV programs or PPV programs and content related to PPV programs. For example, customers may enter a search string in search query field 405. Although not illustrated, additionally, or alternatively, the graphical user interface includes, for example, a menu to permit the customer to search a particular type of PPV program (e.g., a wrestling PPV program, a boxing PPV program, a person (e.g., a specific fighter, a specific comedian or entertainer, etc.). The PPV portal includes a search engine. The search engine uses the search string (or selected menu entry) to generate a search result and provide the search result to the customer.

According to an exemplary embodiment, the graphical user interface may permit the customers to select the type of contents searched. For example, a customer may wish to search PPV programs. Alternatively, the customer may wish to search contents related to a PPV program or a person (e.g., a sports player, a comedian, a musician, etc.) associated with the PPV program. By way of example, contents related to a PPV program or a person may include videos 410, web sites 415, articles 420, bio/stats 425, and images 430.

Videos 410 may include programs related to a particular PPV program. For example, if a customer enters a search query "Pacquiao vs. Marquez." The search engine identifies a PPV program entitled "Manny Pacquiao vs. Manuel Marquez III." Additionally, the search engine identifies related video content, such as, for example, previous boxing matches (e.g., with Manny Pacquiao, with Manuel Marquez, prior matches between Manny Pacquiao and Manuel Marquez), spotlight videos pertaining to Manny Pacquiao and/or Manuel Marquez (e.g., training sessions, interviews, highlights of career, etc.), and/or advertisements promoting the PPV program. The source of videos 410 may be PPV programs or other types of sources (e.g., premium channel programs, such as, HBO®, Showtime®, etc., non-premium channel programs, free video-on-demand content, Internet content, etc.). Depending on the source of the program, some or all of the related content may be available to a particular customer. For example, a premium channel program may not be available to a customer that does not subscribe to the premium channel service.

Web sites 415 may include Uniform Resource Locators (URLs) pertaining to the PPV program or a person associated with the PPV program. For example, with reference to the PPV program entitled "Manny Pacquiao vs. Manuel Marquez III," web sites 415 may include links pertaining to Manny Pacquiao and Manuel Marquez. Articles 420 may include various types of written articles pertaining to the PPV program or a written article pertaining to a person associated with the PPV program. For example, with reference to the PPV program entitled "Manny Pacquiao vs. Manuel Marquez III," articles 420 includes written articles pertaining to Manny Pacquiao and Manuel Marquez, such as sports articles, entertainment articles, news articles, press releases, etc.

Bio/stats 425 may include biographical summaries and stats pertaining to a person associated with the PPV program. For example, with reference to the PPV program entitled "Manny Pacquiao vs. Manuel Marquez III," bio/stats 425 may include a biological summary pertaining to Manny Pacquiao and Manuel Marquez, and stats (e.g., boxing record, height, weight, age, reach, etc.) pertaining to Manny Pacquiao and Manuel Marquez. Images 430 may include pictures of a person associated with the PPV program. For example, with reference to the PPV program entitled "Manny Pacquiao vs. Manuel Marquez III," images 430 may include pictures of Manny Pacquiao and Manuel Marquez inside and outside of the ring, pictures of family members, etc.

Referring to FIG. 3, sub-portal service 315 may provide customers with various portals directed to various types of categories or categories and sub-categories pertaining to PPV programs. For example, FIG. 5 is a diagram illustrating an exemplary graphical user interface of the PPV portal pertaining to PPV sub-portals.

Figure 5:
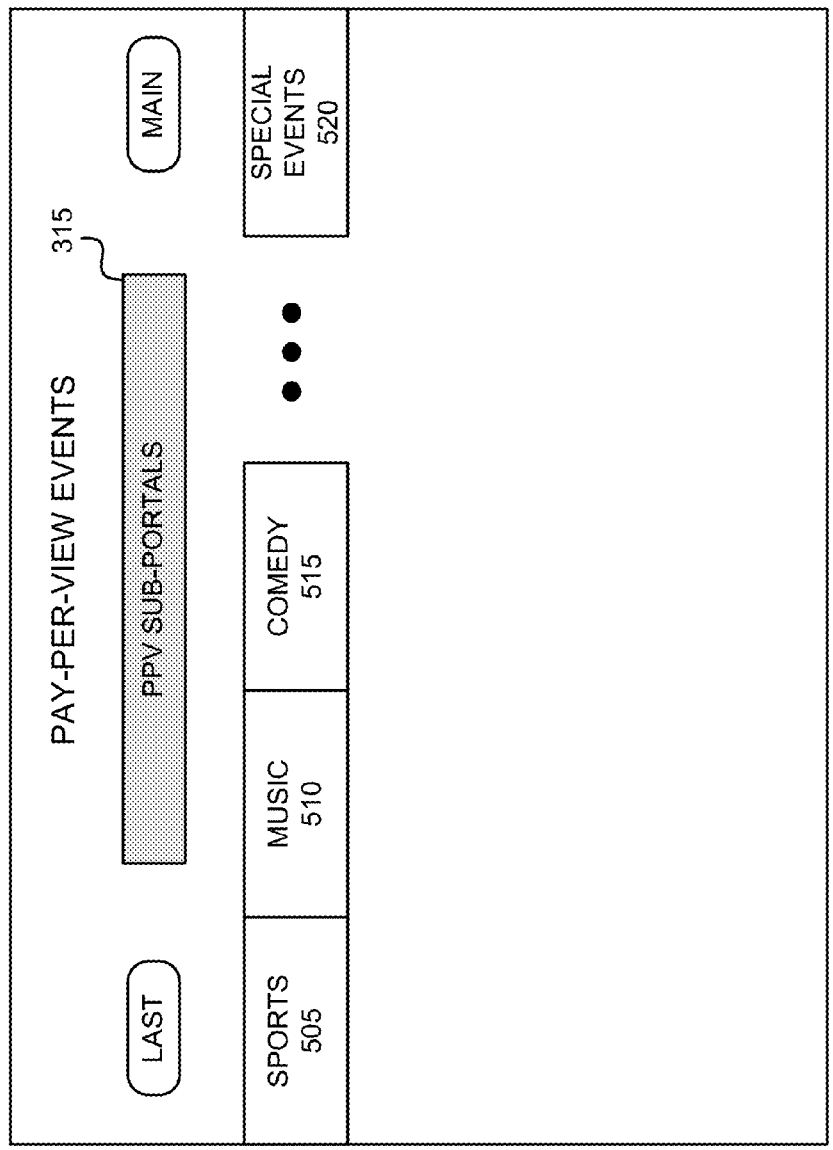
FIG. 5 is a diagram illustrating an exemplary graphical user interface of the PPV portal pertaining to PPV sub-portals.

As illustrated in FIG. 5, the graphical user interface includes a sports portal 505, a music portal 510, a comedy portal 515, and a special events portal 520. According to other examples, the graphical user interface may include additional portals, different portals, or fewer portals. For example, the graphical user interface may include an adult content portal.

By way of example and with reference to sports portal 505, customers may access various sports categories, such as, boxing, MMA, wrestling, basketball, football, cycling, golf, etc. Additionally, other sub-categories and sub-portals may be provided. For example, with reference to the sport of boxing, sub-portals may pertain to specific fighters (e.g., Manny Pacquiao, Bernard Hopkins, Wladimir Klitschko, etc.), specific weight-classes (e.g., welterweight, middleweight, heavyweight, etc.), and/or type of fights (e.g., non-title fight, championship fight, rubber match, etc.). According to another example, with reference to other sports categories, sports portal 505 may include sub-categories and sub-portals pertaining to a particular sports player (e.g., Tiger Woods, etc.), etc.

Additionally, by way of example and with reference to music portal 510, customers may access various music categories, such as, types of music (e.g., classical, rock, country, etc.), names of bands, names of musicians, and types of concerts (e.g., tour, last or farewell concert, unplugged, live, etc.). Additionally, by way of example and with reference to comedy portal 515, customers may access various comedy categories, such as female comedians, male comedians, and types of comedy events (e.g., raw, uncensored, farewell, etc.). Additionally, by way of example, and with reference to special events portal 520, customers may access various special event categories, such as, holiday events, festivals, etc. The PPV portal may also provide third-party sub-portals to permit third parties to promote PPV programs. As an example, a third party (e.g., WWE) may purchase advertisement space for a sub-portal to promote a PPV program (e.g., SmackDown) sponsored by the third party (e.g., WWE) or some other party (e.g., Skittles).

Referring to FIG. 3, recommendations service 320 may provide customers with recommendations of PPV programs. According to an exemplary embodiment, the PPV portal may include a recommendation engine that recommends PPV programs to customers. According to an exemplary embodiment, the PPV portal identifies the customer based on a login, a network address, and/or a device identifier, as previously described.

According to an exemplary embodiment, the recommendation engine selects PPV programs to recommend to a particular customer based on past PPV program purchases. By way of example, a customer that has previously purchased one or more PPV boxing events, the recommendation engine may recommend other PPV boxing events, or other PPV boxing events and MMA events. Additionally, according to this example, if further commonality between multiple, previously purchased PPV boxing events exist (e.g., a boxer(s), a weight class, day of event, time in day of event, etc.), the PPV programs recommended to the customer, by the recommendation engine, may take these commonalities into account.

The recommendation engine may also use other sources to derive PPV program recommendations. For example, a customer's purchasing and viewing history pertaining to video-on-demand content (e.g. movies, documentaries, television series, etc.), web site viewing of content (e.g., www.hbogo.com or other streaming services provided by the service provider), and/or other television channel, television package, and/or television service subscriptions (e.g., NFL Redzone, WWE, etc.) may be indicative of the customer's preferences for particular types of PPV programs. For example, a customer that has previously purchased (e.g., via video-on-demand) and/or viewed (e.g., via HBO GO®, etc.) one or more action movies, the recommendation engine may recommend PPV programs pertaining to boxing or MMA events. According to another example, a customer that has previously purchased or viewed one or more movies in the comedy genre, the recommendation engine may recommend PPV programs pertaining to comedic events.

Figure 6:
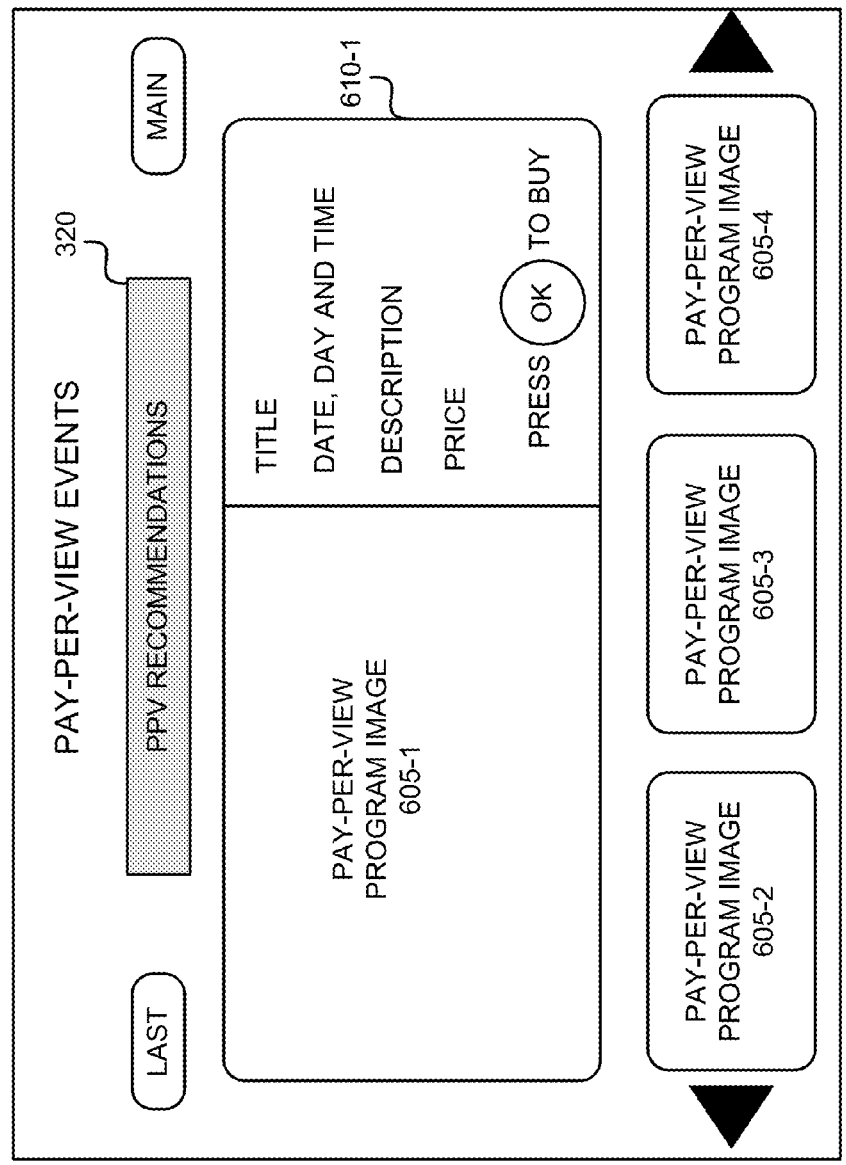
FIG. 6 is a diagram illustrating an exemplary graphical user interface of the PPV portal pertaining to PPV program recommendations.

FIG. 6 is a diagram illustrating an exemplary graphical user interface of the PPV portal pertaining to PPV program recommendations. As illustrated in FIG. 6, the graphical user interface may include PPV program images, such as PPV program images 605-1 through 605-4, that each illustrates an image representative of a recommended PPV program. Additionally, the graphical user interface may include a description, such as a description 610-1 that provides information pertaining to a recommended PPV program. In the example, description 610-1 includes a title of the recommended PPV program; date, day, and time of the PPV program; description of the recommended PPV program (e.g., a summary of the content, etc.); and the price of the recommended PPV program. The graphical user interface may also permit the customer to purchase the recommended PPV program. According to other embodiments, the graphical user interface may not include a PPV program image and/or some of the description information described herein.

Referring to FIG. 3, calendar services 325 may provide customers with PPV calendars that display PPV program information pertaining to PPV programs. The PPV programs may include upcoming PPV programs, PPV programs purchased by the customers, and/or recommended PPV programs. For example, FIG. 7 is a diagram illustrating an exemplary graphical user interface of the PPV portal pertaining to PPV calendars.

Figure 7:
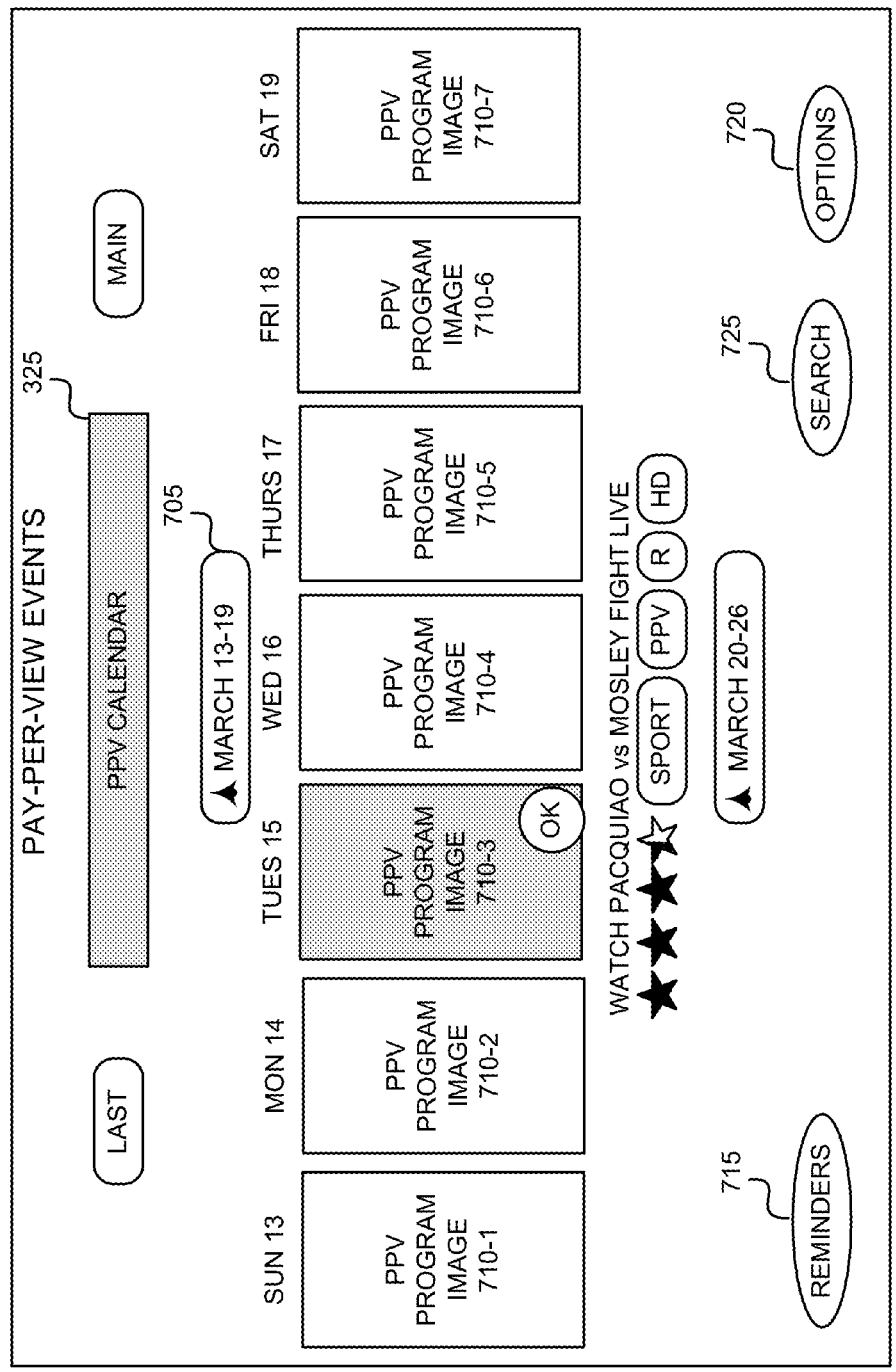
FIG. 7 is a diagram illustrating an exemplary graphical user interface of the PPV portal pertaining to PPV calendars.

As illustrated in FIG. 7, the graphical user interface includes a time frame indicator 705 pertaining to a PPV calendar. In this example, the time frame indicator 705 is set in a weekly format (e.g., March 13-March 19). As previously described, PPV calendar service 325 may permit a customer to view the PPV calendar in various timeframe formats (e.g., daily, weekly, monthly, or quarterly) via options button 720, as described further below. Alternatively, time frame indicator 705 may be an interactive graphical element that permits the user to select a particular timeframe.

As further illustrated, the graphical user interface includes PPV program images 710-1 through 710-7 (referred to as PPV program images 710 or PPV program image 710) in a calendar format. PPV program images 710 may include images (e.g., posters) representative of upcoming PPV programs, PPV programs purchased by the customers, and/or recommended PPV programs. In this example, PPV program images 710 are representative of upcoming PPV programs. However, in practice, a particular day may include multiple PPV programs, in which case, multiple PPV program images 710 may be displayed or a listing of titles of the pay-per-view programs. Alternatively, the customer may set a user preference, via options button 720, to filter all the upcoming PPV images, based on category or sub-category of PPV programs, or some other grouping factor (e.g., price, time of airing, etc.), as previously described.

According to an exemplary embodiment, a user may select an image or while navigating from one image to the next to cause to be displayed information pertaining to the PPV program represented by the image. The information displayed may include the title of the PPV program, the type of PPV program (e.g., sports, etc.), a rating associated with the PPV program (e.g., PG, R, etc.), and/or a format of the PPV program (e.g., high-definition, 3-D, etc.).

According to other scenarios, the graphical user interface includes PPV program images 710 of purchased PPV programs, recommended PPV programs (e.g., based on PPV recommendation services 320), listing of titles, etc.

The graphical user interface may permit the customer to order and purchase an upcoming PPV program from the PPV calendar. For example, the customer may select a PPV program image 710 (e.g., PPV program image 710-3) and order and purchase or begin the process of ordering and purchasing the selected PPV program (e.g., "Pacquiao vs. Mosley Fight Live") by selecting an icon (e.g., an OK button) or some other type of graphic.

The graphical user interface may also permit the customer to set reminders (e.g., via a reminders button 715). For example, the customer may set reminders regarding PPV programs purchased. As an example, PPV calendar service 325 may permit the customer to select a PPV program about which to be reminded. According to an exemplary implementation, the customer may select the time and/or frequency of the reminder and the type of reminder. For example, the customer may select when the reminder is provided to the customer (e.g., a date and a time setting) and the frequency of the reminder (e.g., once, periodic). According to another implementation, the reminder may automatically be provided to the customer based on various triggering events, such as when the customer accesses the PPV portal or when the customer uses a service (e.g., the television service, etc.) within a time window from the day of the PPV program airing.

The customer may select the type of reminder, such as, a message (e.g., an email, an automated voice message, etc.) or an overlay displayed when the customer is using a service (e.g., watching television, etc.). Alternatively, PPV calendar service 325 may rely on default settings regarding the type of reminder.

Additionally, the graphical user interface may also permit the customer to set customer preferences (e.g., via options button 720) pertaining to PPV calendar service 325. For example, the customer may select the time frame format of the PPV calendar, the type of PPV program images displayed (e.g., upcoming, purchased, recommended, etc.), sort PPV programs by PPV program type categories and/or sub-categories, and/or reminder preferences.

The graphical user interface may also permit the customer to search for a PPV program via a search button 725. As an example, the customer may search (e.g., by inputting a search query) the PPV calendar for a particular PPV program when the PPV calendar is displaying the upcoming PPV programs. Additionally, or alternatively, options button 720 may permit the customer to filter PPV programs by category, sub-category, or some other type of grouping factor. According to other embodiments, the PPV calendar may not include PPV program images for some or all of the PPV programs and/or other descriptive information pertaining to a PPV program.

Referring to FIG. 3, ordering and purchasing services 330 permits customers to purchase PPV programs well in advance of the airing of the PPV programs. As previously described, as is well-known, PPV systems permit customers to order PPV programs (e.g., via television service) only within a relatively short time frame prior to the airing of the PPV programs. In contrast, ordering and purchasing services 330 of the PPV portal permits customers to order and purchase PPV programs within a much longer period of time prior to the air time of the PPV program. For example, customers may purchase the PPV program on the day of the first advertisement of the PPV program, or for PPV programs that do not include advertisements, the time period may be several hours, day(s), week(s), or month(s) in advance of the airing of the PPV program.

Figure 8:
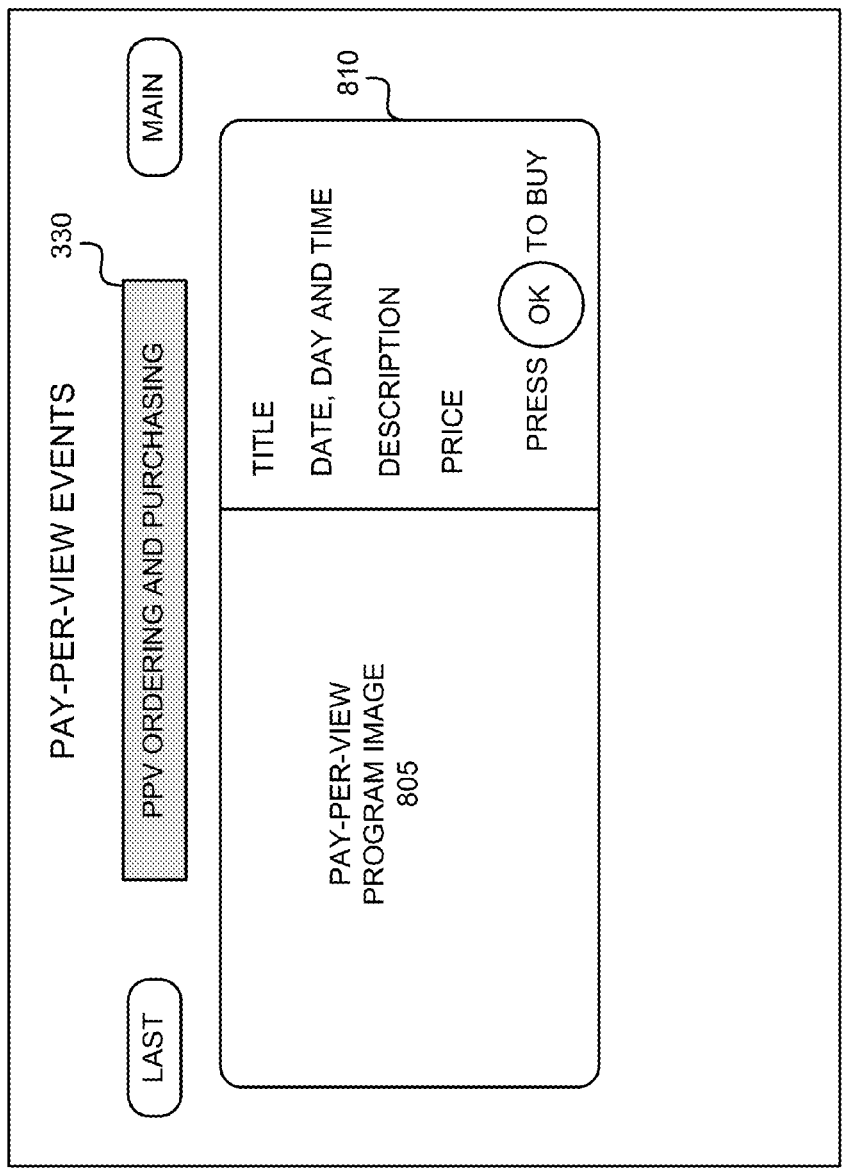
FIG. 8 is a diagram illustrating an exemplary graphical user interface of the PPV portal pertaining to ordering and purchasing PPV programs.

FIG. 8 is a diagram illustrating an exemplary graphical user interface of the PPV portal pertaining to ordering and purchasing PPV programs. As illustrated, the graphical user interface may include a PPV program image, such as PPV program image 805 and a description of the PPV program, such as description 810. PPV program image 805 is an image representative of the PPV program the customer wishes to purchase, and description 810 includes pay-per-view information pertaining to the PPV program, such as title, date, day, and time, a description (e.g., a summary of the PPV program), the price of the PPV program, etc. The graphical user interface also provides an interface to permit the customer to place the order and purchase the PPV program.

Figure 9:
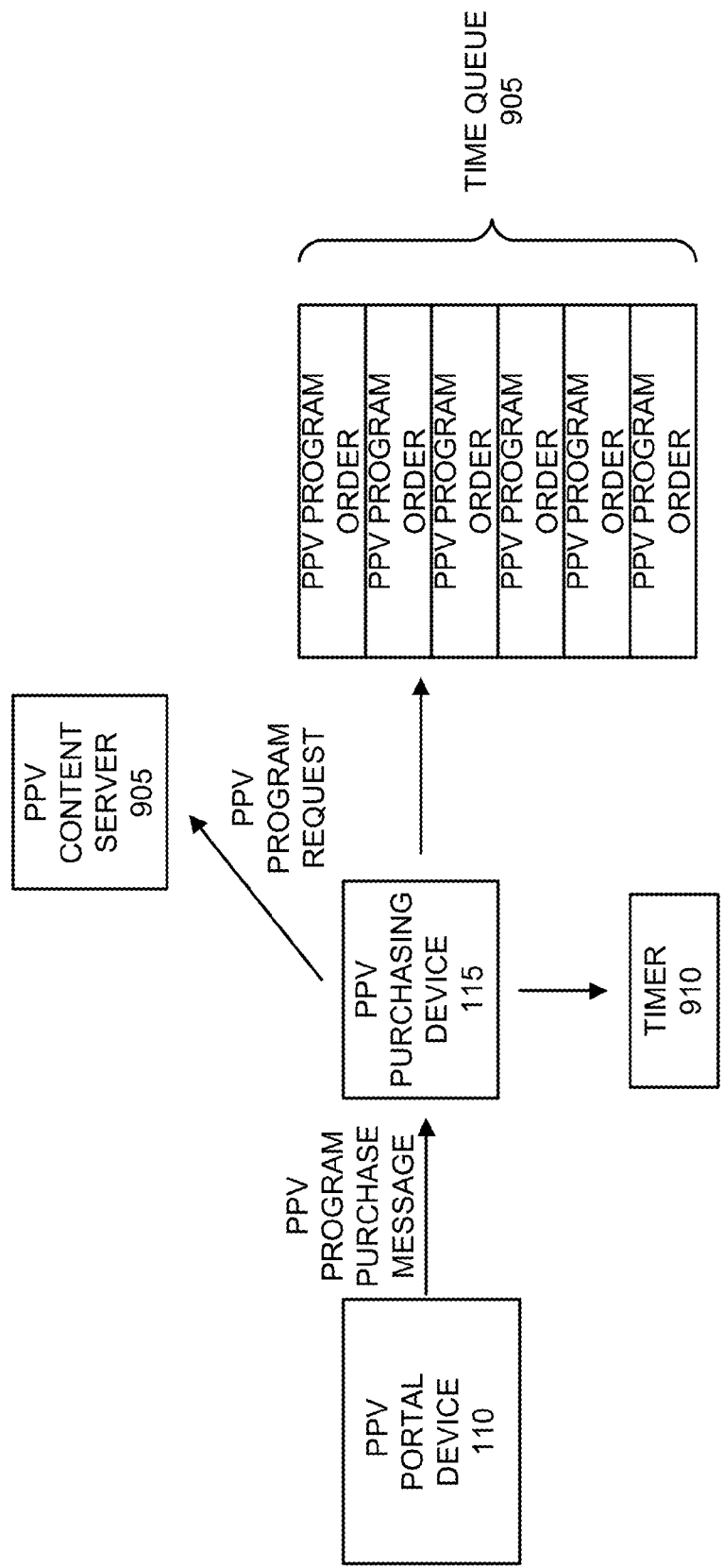
FIG. 9 is a diagram illustrating an exemplary process for managing PPV program purchases.

According to an exemplary scenario and with reference to FIG. 8, assume a customer selects the "OK" button to purchase a PPV program. Also assume that the customer purchases the PPV program approximately one month before the airing the PPV program. PPV portal device 110 processes the customer's order and purchase and generates a PPV program purchase message. The PPV purchase message includes information pertaining to a customer's order and purchase of the PPV program. For example, the PPV purchase message includes the date and time of the PPV program and some unique identifier of the PPV program. Referring to FIG. 9, PPV portal device 110 transmits the PPV program purchase message to PPV purchasing device 115, which is then received by PPV purchasing device 115.

As illustrated in FIG. 9, according to an exemplary embodiment, PPV purchasing device 115 may include a time queue 905. Time queue 905 may store customers' PPV program orders in memory/storage 210 and are managed by PPV purchasing device 115. As an example, the date and time of a PPV program may be continuously compared to a timer 910 (e.g., a clock). When the time is close in proximity to the air time of the PPV program, PPV purchasing device 115 transmits a PPV program request to a PPV content server 905, which may be responsible for the airing and/or delivery of the PPV program to customers. Upon receipt of the PPV program request, PPV content server 905 may then provide for the delivery or the airing of the purchased PPV program to customers.

Referring back to FIG. 8, according to an exemplary embodiment, the PPV portal may provide customers with special discounts or bundles of PPV programs, which the customers may purchase via ordering and purchasing services 330. As an example, a customer may select a PPV program to order and purchase and the customer may be offered a bundle package that includes the selected PPV program and a recommended PPV program (e.g., generated via recommendations service 320). Alternatively, the customer may be offered other available packages or bundles that the service provider has available at the time the customer is making his/her order and purchase. In either case, the customer may order and purchase a PPV program bundle or package via ordering and purchasing service 330.

While various services offered via the PPV portal have been described with respect to various graphical user interfaces, depending on the services to which the customer is subscribed (e.g., Internet service, mobile service, television service), the customer may receive a PPV service via other forms of interface such as, for example, electronic messages (e.g., an e-mail, a Simple Messaging Service (SMS) message, a Multimedia Messaging Service (MMS) message, etc.), voice mail messages, and/or automated telephone call messages.

As previously described, a customer may access the PPV portal via a television service. Alternatively, according to an exemplary embodiment, the customer may access the PPV portal via a mobile service and/or an Internet service. FIGS. 10-14 illustrate exemplary processes that are performed by the PPV portal or devices associated with the PPV portal.

Figure 10:
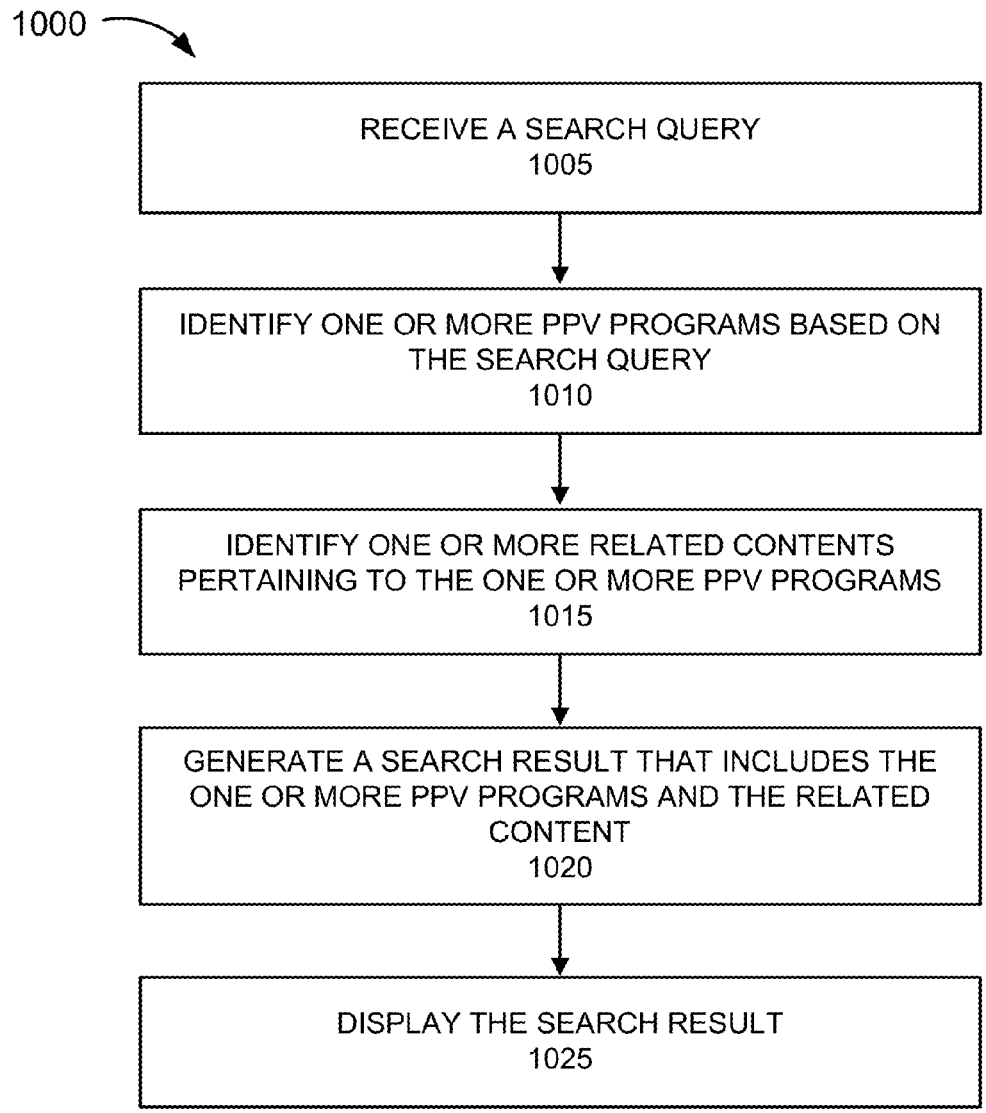
FIG. 10 is a flow diagram illustrating an exemplary process associated with the PPV portal pertaining to PPV program searches.

FIG. 10 is a flow diagram illustrating an exemplary process 1000 associated with the PPV portal pertaining to PPV program searches. According to an exemplary embodiment, PPV portal device 110 may perform process 1000. For example, processor 205 may execute an application 215 to perform the steps described.

Referring to FIG. 10, in block 1005, a search query is received. For example, the PPV portal includes a graphical user interface to permit a customer to select a search query (e.g., from a menu or a list) or enter a search query (e.g., enter a string of letters, letters and numbers, via a keypad or other appropriate input mechanism associated with remote device 165).

In block 1010, one or more PPV programs are identified based on the search query. For example, the PPV portal includes a search engine that searches a repository of pay-per-view information (e.g., images representative of PPV programs, titles of PPV programs, descriptions of PPV programs, names of persons participating in the PPV programs, dates and times, purchase prices, etc.) and selects PPV information associated with each PPV program that matches or is relevant to the search query.

In block 1015, one or more related contents are identified pertaining to the one or more PPV programs. For example, the search engine searches the repository of pay-per-view information and selects the one or more related content. According to an exemplary implementation, one or more related contents are linked to a pay-per-view information associated with a pay-per-view program, so that when the pay-per-view information is identified to be a match or relevant to the search query, the one or more related contents are also identified. For example, a link may take the form of a pointer or some other type of mapping architecture for data and/or information.

In block 1020, a search result that includes the one or more PPV programs and the one or more related contents is generated. For example, the PPV portal generates a search result that includes the pay-per-view information and related content(s) associated with the one or more PPV programs. In block 1025, the search result is displayed. For example, the PPV portal displays the search result to the customer via a graphical user interface.

Figure 11:
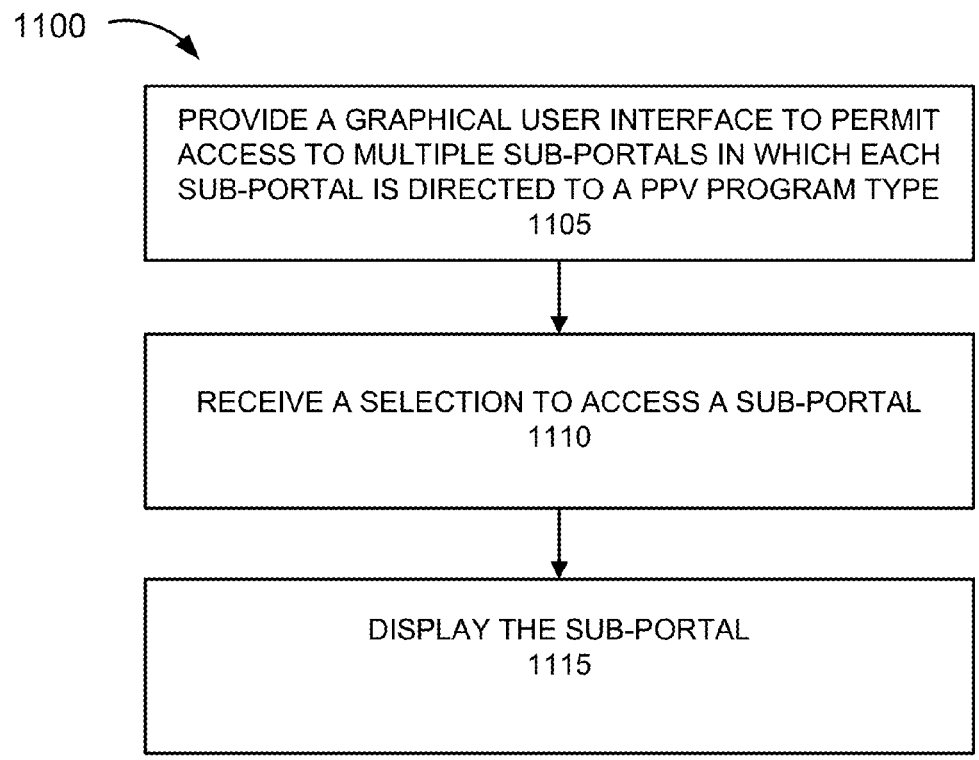
FIG. 11 is a flow diagram illustrating an exemplary process associated with the PPV portal pertaining to PPV sub-portals.

FIG. 11 is a flow diagram illustrating an exemplary process 1100 associated with the PPV portal pertaining to PPV program categories. According to an exemplary embodiment, PPV portal device 110 may perform process 1100. For example, processor 205 may execute an application 215 to perform the steps described.

In block 1105, a graphical user interface, which permits customer access to multiple sub-portals in which each sub-portal is directed to a PPV program type, is provided. For example, the PPV portal includes sub-portals that to a PPV program category, a PPV program sub-category, or some other PPV program grouping (e.g., a fighter, a sports player, a comedian, etc.).

In block 1110, a selection to access a sub-portal is received. For example, a customer selection is received via the graphical user interface. In block 1115, the sub-portal is displayed. For example, the particular sub-portal displays PPV program information (e.g., images representative of PPV programs, titles, prices, etc.) according to the category, sub-category, or other grouping factor associated with the selection.

Figure 12:
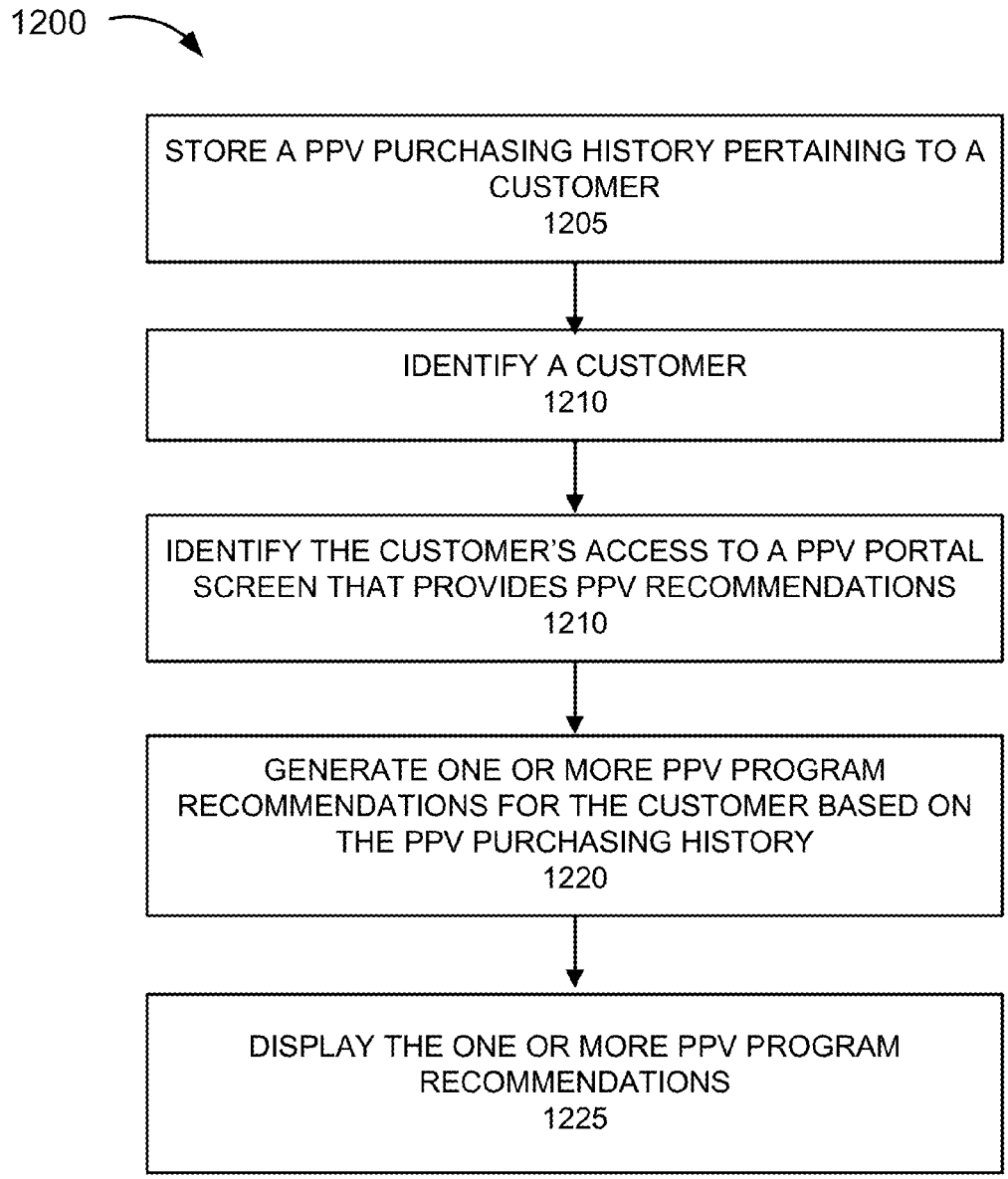
FIG. 12 is a flow diagram illustrating an exemplary process associated with the PPV portal pertaining to PPV program recommendations.

FIG. 12 is a flow diagram illustrating an exemplary process 1200 associated with the PPV portal pertaining to PPV program recommendations. According to an exemplary embodiment, PPV portal device 110 may perform process 1200. For example, processor 205 may execute an application 215 to perform the steps described.

Referring to FIG. 12, in block 1205, the PPV portal stores a pay-per-view purchasing history pertaining to a customer. The pay-per-view purchasing history includes PPV programs purchased and viewed by the customer. Also, as previously described, other types of customer behavior may be stored, such as a customer's purchasing and viewing, or viewing (e.g., for free programs) stemming from video-on-demand, a television subscription package, web site viewing of programs, etc.

In block 1210, a customer is identified. For example, when the customer accesses the PPV portal, the PPV portal identifies the customer based on a login, a device identifier, or a network address. In block 1215, the customer's access to a PPV portal screen that provides PPV recommendations is identified. For example, the PPV portal recognizes a customer's input, via a graphical user interface, to navigate to the PPV portal screen that provides PPV program recommendations.

In block 1220, one or more PPV program recommendations for the customer based on the PPV purchasing history are generated. For example, the PPV portal includes a recommendation engine that identifies PPV program(s) based on the customer's PPV purchasing history and other types of customer behavior. The recommendation engine selects PPV program(s) to recommend to the customer based on this information. For example, the recommendation engine identifies similarities between viewed PPV programs and other viewed or subscribed to programs with available and upcoming PPV programs.

In block 1225, one or more PPV program recommendations are displayed. For example, the PPV portal displays the PPV program recommendations via a graphical user interface. The graphical user interface includes an image representative of each PPV program and other information (e.g., title, etc.).

Figure 13:
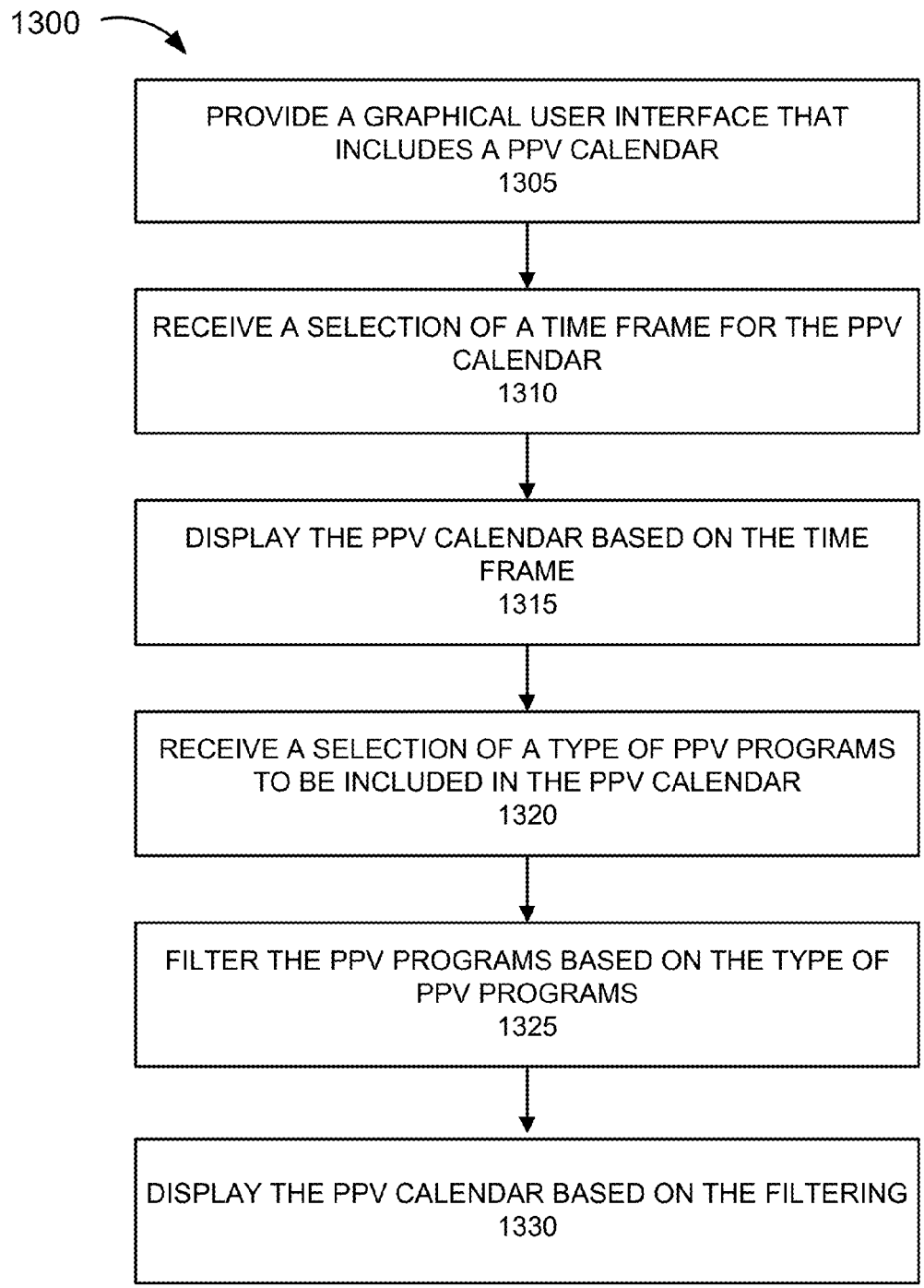
FIG. 13 is a flow diagram illustrating an exemplary process associated with the PPV portal pertaining to PPV calendars.

FIG. 13 is a flow diagram illustrating an exemplary process 1300 associated with the PPV portal pertaining to PPV calendars. According to an exemplary embodiment, PPV portal device 110 may perform process 1300. For example, processor 205 may execute an application 215 to perform the steps described.

Referring to FIG. 13, in block 1305, a graphical user interface that includes a PPV calendar is provided. For example, a customer accesses a PPV portal screen that includes a PPV calendar. As previously described, the PPV calendar includes a calendar and PPV information (e.g., PPV images, titles, prices, etc.) pertaining to the PPV programs. According to an exemplary embodiment, the customer may be identified to provide a personalized PPV calendar. For example, the personalization may include the type of PPV programs displayed by the PPV calendar, the time format, and/or other preferences customized by the customer. For example, in block 1310, a selection of a time frame (e.g., daily, weekly, bi-weekly, monthly, quarterly, etc.) for the PPV calendar is received. In block 1315, the PPV calendar displays PPV programs according to the selected time frame.

In block 1320, a selection of the type of PPV programs to be included in the PPV calendar is received. For example, the selection indicates a particular category or sub-category of PPV program, recommended PPV programs, or other filtering parameters (e.g., time of airing (e.g., evening only, after 8 p.m.), by fighter, by sports player, etc.).

In block 1325, the PPV programs are filtered based on the type of PPV program. For example, the PPV calendar filters the PPV information pertaining to the PPV programs. In block 1330, the PPV calendar displays PPV information based on the filtering performed in block 1320.

Figure 14:
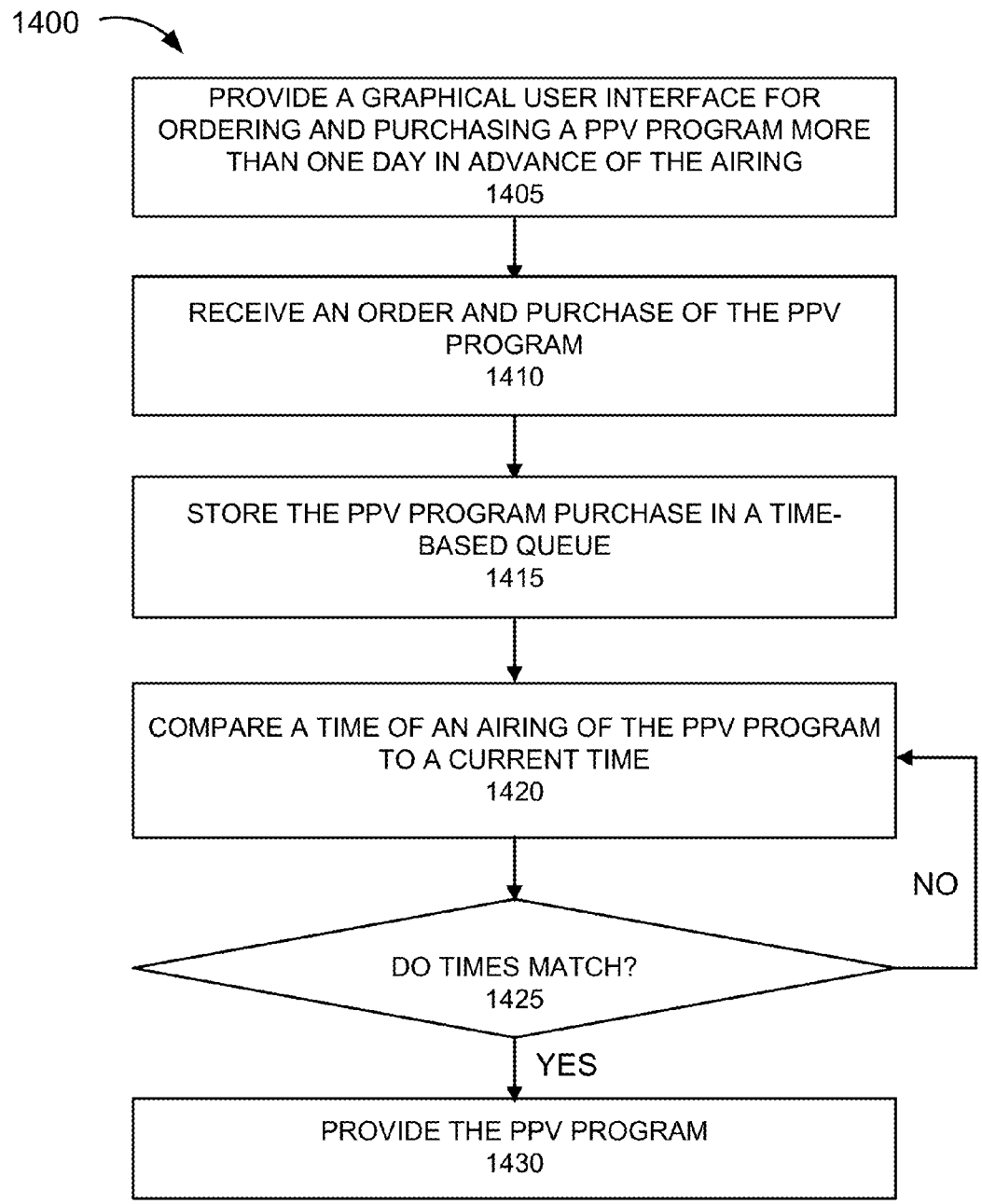
FIG. 14 is a flow diagram illustrating an exemplary process associated with the PPV portal pertaining to ordering and purchasing PPV programs.

FIG. 14 is a flow diagram illustrating an exemplary process 1400 associated with the PPV portal pertaining to ordering and purchasing PPV programs. According to an exemplary embodiment, PPV portal device 110 and PPV purchasing device 115 may perform process 1400. For example, processor 205 may execute an application 215 to perform the steps described.

Referring to FIG. 14, in block 1405, the PPV portal of PPV portal device 110 includes a graphical user interface for ordering and purchasing a PPV program more than one day in advance of the airing. As previously described, conventional PPV systems (e.g., via a television service) permit customers to order, order and purchase, or purchase a PPV program a short time frame (e.g., 30 minutes or 1 hour) prior to the airing of the PPV program. In contrast, the PPV portal permits customers to order, order and purchase, or purchase the PPV program hours, day(s), week(s), or month(s) in advance of the air time of the PPV program.

In block 1410, the PPV portal receives an order and a purchase of the PPV program. For example, the graphical user interface displays PPV information pertaining to a PPV program. The graphical user interface includes an interface to allow the customer to order and purchase the PPV program. The PPV portal generates a PPV program purchase entry, when the customer's order and purchase is confirmed, which may involve other device(s) (e.g., a billing device, etc.). The PPV program purchase entry may include an identifier of the PPV program and a time of airing of the PPV program.

In block 1415, the PPV program purchase entry is stored in a time-based queue. For example, PPV purchasing device 115 includes a time queue 905 that stores PPV program purchase entries associated with customers. In block 1420, PPV purchasing device 115 continuously compares a time of an airing of the PPV program to a current time. In block 1425, PPV purchasing device 115 determines whether the time of the airing of the PPV program and the current time match. As illustrated in FIG. 14, when the times do not match (block 1425—NO), then process 1400 continues to block 1420. When the times do match (block 1425—YES), process 1400 continues to block 1430. In block 1430, the PPV program is provided. For example, PPV purchasing device 115 communicates with appropriate devices (e.g., a PPV program server) to delivery or air the PPV program to the customer.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 10-14, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 205, etc.), a combination of hardware and software (e.g., application 215), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive. For example, although a PPV portal has been described with reference to PPV programs, one or more services and/or functions described may be applicable to non-PPV programs. For example, the category service, the recommendation service, and the calendar service may be implemented toward non-PPV programs. For example, these services may be applied to regular television programs and premium programs (e.g., HBO®, Starz®, etc.).

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   displaying a graphical user interface that permits a customer to input a search request to search for a pay-per-view program;
   receiving a search query, via the graphical user interface, directed to a search of a pay-per-view program;
   identifying, in response to the search query, pay-per-view information pertaining to one or more pay-per-view programs based on the search query, wherein the pay-per-view information includes one or more program summaries pertaining to the one or more pay-per-view programs;
   identifying, in response to the search query, related contents pertaining to the one or more pay-per-view programs;
   generating a search result that includes the pay-per-view information and the related contents pertaining to the one or more pay-per-view programs, wherein the related contents include a news article, an entertainment article, a press release, a web-based article, a biographical summary, and a video advertisement promoting the one or more pay-per-view programs;
   displaying the search result via another graphical user interface; and
   displaying graphical user interfaces to permit the customer to identify available pay-per-view programs, wherein each of the graphical user interfaces is dedicated to a category or a sub-category of pay-per-view program types, and wherein one of the graphical user interfaces is dedicated to a person-specific sub-category.

2. The method of claim 1, further comprising:
   receiving a request to access a pay-per-view calendar;
   displaying a graphical user interface, in response to the request, of the pay-per-view calendar, wherein the pay-per-view calendar includes pay-per-view information for each pay-per-view program displayed in a time field of the pay-per-view calendar corresponding to an air time of a pay-per-view program;
   receiving a time frame setting that indicates a time frame to be displayed by the pay-per-view calendar, wherein the time frame setting includes a time frame of a day, a week, or a month;
   generating another graphical user interface of the pay-per-view calendar based on the received time frame setting; and
   displaying the generated graphical user interface of the pay-per-view calendar.

3. The method of claim 1, further comprising:
   storing a viewing history of viewed content by the customer, wherein the viewing history includes a pay-per-view purchasing history associated with the customer;
   identifying the customer;
   receiving a request to access a pay-per-view recommendations screen;
   generating, in response to the request, one or more pay-per-view program recommendations for the customer based on the viewing history associated with the identified customer; and
   displaying a graphical user interface that includes pay-per-view information representative of the one or more pay-per-view program recommendations.

4. The method of claim 3, wherein the generating comprises generating the one or more pay-per-view program recommendations based on the customer's television service subscription and non-pay-per-view programs viewed by the identified customer.

5. The method of claim 1, further comprising:
displaying one or more graphical user interfaces to permit the customer to order and purchase a pay-per-view program, via a television service, more than a day before an airing of the pay-per-view program;
receiving the customer's selection of the pay-per-view program to order and purchase;
storing the customer's selection of the pay-per-view program in a time-based queue;
comparing a scheduled time of the pay-per-view program to a current time;
determining whether the scheduled time matches the current time; and
providing the pay-per-view program to the customer when the scheduled time matches the current time.

6. The method of claim 1,
wherein the graphical user interface permits the customer to select one or more types of related content to search.

7. The method of claim 1, wherein the category includes a sports-related pay-per-view program type, a music-related pay-per-view program type, and a comedy-related pay-per-view program type.

8. The method of claim 1, wherein the related contents include one or more related videos pertaining to a featured person included in the one or more pay-per-view programs.

9. A device comprising:
a communication interface;
one or more memories that store instructions; and
one or more processors to execute the instructions to:
display a graphical user interface to permit a customer of a pay-per-view service to:
input a search request to search for a pay-per-view program;
identify pay-per-view information representative of one or more pay-per-view programs based on the search request, wherein the pay-per-view information includes one or more program summaries pertaining to the one or more pay-per-view programs;
identify related contents pertaining to the one or more pay-per-view programs based on the search request;
generate a search result that includes the pay-per-view information and the related contents;
display the search result that includes the pay-per-view information and the related contents, wherein the related contents include a news article, an entertainment article, a press release, a web-based article, a biographical summary, and a video advertisement promoting the one or more pay-per-view programs; and
display graphical user interfaces to permit the customer to identify available pay-per-view programs, wherein each of the graphical user interfaces is dedicated to a category or a sub-category of pay-per-view program types, and wherein one of the graphical user interfaces is dedicated to a person-specific sub-category.

10. The device of claim 9, wherein the one or more processors further execute the instructions to:
identify the customer;
retrieve a pay-per-view purchasing history associated with the customer;
generate one or more pay-per-view program recommendations for the customer based on the pay-per-view purchasing history associated with the customer; and
display a graphical user interface that includes one or more images representative of the one or more pay-per-view program recommendations.

11. The device of claim 10, wherein the graphical user interface that includes one or more images representative of the one or more pay-per-view program recommendations includes a main image representative of a pay-per-view program and three images each of a size smaller relative to the main image and each of a same size relative to each other, wherein each of the three images represents a different pay-per-view program, and wherein information pertaining to the pay-per-view program represented by the main image is included proximate to the main image.

12. The device of claim 10, wherein, when generating the one or more pay-per-view program recommendations, the one or more processors further execute the instructions to:
generate the one or more pay-per-view program recommendations based on at least one of the customer's television service subscription or non-pay-per-view television programs viewed by the customer.

13. The device of claim 9, wherein the one or more processors further execute the instructions to:
display a graphical user interface that includes a pay-per-view calendar, wherein the pay-per-view calendar includes pay-per-view information for each pay-per-view program displayed in a time field of the pay-per-view calendar;
receive a selection of a type of pay-per-view program to be displayed by the pay-per-view calendar;
identify, in response to the selection, the customer associated with the selection;
generate a pay-per-view calendar that includes the type of pay-per-view program based on the selection; and
display a graphical user interface that includes the generated pay-per-view calendar that includes pay-per-view information for each pay-per-view program that is of the type selected, wherein the type selected is at least one of an upcoming pay-per-view program type, a recommended pay-per-view program type, or a pay-per-view program purchased by the customer.

14. The device of claim 13, wherein the graphical user interface that includes the generated pay-per-view calendar includes a time frame indicator element that indicates a time frame format for the calendar, wherein the time frame format is configurable to one of a day, a week, or a month, and the graphical user interface that includes the generated pay-per-view calendar includes one or more images representative of one or more pay-per-view programs in correspondence to the time frame format of the generated pay-per-view calendar, and wherein the generated pay-per-view calendar includes a reminder element that permits the customer to set a reminder pertaining to a pay-per-view program.

15. The device of claim 9, wherein the pay-per-view service is provided via a television service, a mobile service, or an Internet service, and wherein the one or more processors further execute the instructions to:
display one or more graphical user interfaces to permit the customer to order and purchase a pay-per-view program, via the television service, the mobile service, or the Internet service, more than a day before an airing of the pay-per-view program.

16. The device of claim 9, wherein the graphical user interface permits the customer to select one or more types of related content to search.

17. The device of claim 9, wherein the sub-category of pay-per-view program types include a sports-related pay-per-view program type, wherein the sports-related pay-per-view type includes a boxing-related pay-per-view program type and a mixed martial arts (MMA)-related pay-per-view program type.

18. A method comprising:
providing pay-per-view program services to customers, wherein the pay-per-view program services include:
identifying a customer of the pay-per-view program services;
storing a viewing history associated with the customer, wherein the viewing history includes a pay-per-view program purchasing history and a non-pay-per-view program viewing history;
generating one or more pay-per-view program recommendations for the customer based on the viewing history;
displaying a graphical user interface that includes pay-per-view information representative of the one or more pay-per-view program recommendations; and
displaying graphical user interfaces to permit the customer to identify available pay-per-view programs, wherein each of the graphical user interfaces is dedicated to a category or a sub-category of pay-per-view program types, and wherein one of the graphical user interfaces is dedicated to a person-specific sub-category.

19. The method of claim 18, wherein the pay-per-view program services further include:
displaying a graphical user interface to receive a search request to search for a pay-per-view program;
receiving a search request;
selecting pay-per-view information representative of one or more pay-per-view programs based on the search request, wherein the pay-per-view information includes a title for each of the one or more pay-per-view programs;
selecting one or more related contents associated with the one or more pay-per-view programs, wherein the one or more related contents include at least one of one or more written articles pertaining to one or more persons participating in the one or more pay-per-view programs or one or more other non-pay-per-view programs;
generating a search result that includes the pay-per-view information and the one or more related contents; and
displaying the search result.

20. The method of claim 18, further comprising:
displaying a graphical user interface to permit the customer to use a pay-per-view calendar, wherein the pay-per-view calendar includes pay-per-view information for each pay-per-view program displayed in a time field of the pay-per-view calendar;
receiving a selection of a type of pay-per-view program to be displayed by the pay-per-view calendar;
generating a pay-per-view calendar that includes the type of pay-per-view program based on the selection; and
displaying a graphical user interface that includes the generated pay-per-view calendar and includes pay-per-view information for each pay-per-view program that is of the type selected, wherein the type selected is at least one of an upcoming pay-per-view program type, a pay-per-view program purchased by the customer, or a person-specific pay-per-view program type.

21. The method of claim 18, wherein the pay-per-view services are provided via a television service, and the method further comprises:
receiving a request to view pay-per-view programs that are available to purchase;
displaying, in response to the request, one or more graphical user interfaces that include pay-per-view programs that are available to purchase, wherein the pay-per-view programs are scheduled to air more than one day later from a receipt of the request;
receiving a selection to purchase one of the pay-per-view programs;
storing the selection of the pay-per-view program in a time-based queue;
identifying when a time that the pay-per-view program is to air occurs; and
providing the pay-per-view program to the customer at the time the pay-per-view program is to air.

22. The method of claim 18, wherein the person-specific includes a music figure or a sports figure, and wherein the method further comprises:
displaying a third party sub-portal.

* * * * *